(12) United States Patent
Hart et al.

(10) Patent No.: US 6,788,304 B1
(45) Date of Patent: Sep. 7, 2004

(54) METHOD AND SYSTEM FOR ANTIALIASED PROCEDURAL SOLID TEXTURING

(75) Inventors: John C. Hart, Pullman, WA (US);
Stephen A. Tibbitts, Roy, WA (US);
Terrence J. Coleman, Federal Way, WA (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 09/719,079

(22) PCT Filed: Jun. 4, 1999

(86) PCT No.: PCT/US99/12537

§ 371 (c)(1),
(2), (4) Date: Dec. 5, 2000

(87) PCT Pub. No.: WO99/63489

PCT Pub. Date: Dec. 9, 1999

Related U.S. Application Data

(60) Provisional application No. 60/088,879, filed on Jun. 11, 1998.

(51) Int. Cl.[7] .................................................. G09G 5/02
(52) U.S. Cl. ...................................................... 345/586
(58) Field of Search ................................. 345/582–588, 345/430

(56) References Cited

U.S. PATENT DOCUMENTS 5,905,504 A * 5/1999 Barkans et al. ............. 345/597

OTHER PUBLICATIONS

Barad et al., "Real–Tiem Procedural Texturing Techniques Using MMX", May 1, 1998, Gamasutra.*
Gardner, Simulation of Natural Scenes Using Textured Quadric Surfaces:, 1/84, ACM, pp. 11–20.*
Rhoades et al., "Real–Time Procedural Textures", 6/92, ACM, pp. 95–100.*
Mirho, "Procedural Textures Bring Nature to Internet Explorer 4.0", 1/98, Microsoft.*
Musgrave et al., "The Synthesis and Rendering of Eroded Fractal Terrains", 7/89, ACM, vol. 23, pp. 41–50.*
Peachey, "Solid Texturing of Complex Surfaces", 1985, ACM, vol. 19, pp. 279–286.*
Lewis, "Algorithms for Solid Noise Synthesis", 1989, Siggraph, pp. 1–10.*
Perlin, "An Image Synthesizer", 1985, ACM, vol. 19, pp. 287–294.*

* cited by examiner

Primary Examiner—Mark Zimmerman
Assistant Examiner—Linzy McCartney
(74) Attorney, Agent, or Firm—Thorpe North & Western LLP

(57) ABSTRACT

A procedural solid texturing system which uses a parameterized function capable of reproducing the most common procedural solid textures, specifically wood, marble, clouds and fire (32). This model is simple enough to be implemented in hardware, and can be realized in VLSI with as little as 100,000 gates. The invention also includes a method for antialiasing the parameterized procedural textures (34, 36). The antialiasing includes an expression for the necessary box filter width, a technique for efficiently box filtering the procedural texture by either MIP mapping the color table or using a summed area color table (38).

12 Claims, 6 Drawing Sheets

METHOD AND SYSTEM FOR ANTIALIASED PROCEDURAL SOLID TEXTURING

This Application claims the benefit of Provisional Application No. 60/088,879, filed Jun. 11, 1998.

TECHNICAL FIELD

This invention relates generally to the field of computer graphics, and more particularly to antialiasing parameterized procedural solid textures in a computer graphics system.

BACKGROUND ART

Procedural solid texturing is a method for simulating the sculpture of objects of arbitrary detail and type, out of a solid material such as wood or stone. Procedural solid texture also simulates the natural elements of fire, water, waves, clouds, and earth (terrain and planets) on computer modeled objects. Solid texturing creates the illusion that a shape is carved out of a solid three-dimensional substance. For example, FIGS. 1 and 3 show representations of a marble and wood texture pattern (without coloring). The grain features on the sphere in FIG. 1 and teapot in FIG. 3 align with the block of material out of which they were sculpted. FIG. 1 shows a line drawing of a marble texture where the veins of the marble 22 are shown and would be on a rock colored background 24. FIG. 2 is a line drawing of a fractal planet where there are patches of fractal mountains 26 and a procedurally textured ocean 28. FIG. 3 shows a teapot 29 carved out of a block of wood which is procedurally textured with a wood grain 32 and a wood background color 30. High quality prints which show the fine details and coloring generated by the procedural textures can be found in Section 20.8 of *Computer Graphics: Principles and Practice*, Foley D., Second Edition, 1996, Addison-Wesley Publishing. By using procedural solid texturing, the details of a solid texture align across edges and corners of a jointed object surface. For example, when a procedural texture is applied to a teapot of FIG. 3 it appears to be carved out of the same continuous block, whereas a tiled texture would inevitably be disjointed at the seams. Depending on the detail and type of the object, similar alignment of two dimensional (2D) image texture maps can be tricky or even impossible.

Procedural textures require much less memory than stored image textures, and unlike image textures their resolution depends only on computation precision. Procedural textures which simulate sky and water can extend to infinity with non-repeating procedural detail. Fire may also be procedurally textured on a single polygon with repeating fine detail. Simulated planet coastlines can reveal an arbitrarily intricate level of detail depending on the number of noise functions used in the generation of its procedural texture. Even the reflection of the moon on water can be simulated without ray tracing or environment mapping by manipulation of the color maps of a procedural texture.

While this popular, powerful and flexible technique is found in nearly all high-quality photorealistic rendering packages, it has not yet found its way into consumer-level hardware for real-time rendering. Procedural solid textures would greatly enrich the quality of some of the 2D-image-textured graphical elements found in 3-D interactive games and virtual worlds. These types of textures would provide not only wooden and stone objects, but expansive terrain, oceans and skies filled with non-repeating detail.

Some have identified memory bandwidth as a major obstacle in increasing the performance of real-time graphics hardware. While memory size grows at a rate of 50% per year (one thousandfold over the past two decades), memory bandwidth only grows 12% per year (only tenfold over the past two decades). Conventional 2D texture mapping, in particular, relies heavily on memory. The bandwidth of this memory is the primary factor limiting the number and complexity of 2D image textures available in real-time. Some have overcome the memory bandwidth limitation at the expense of increasing memory size to hold multiple redundant copies of the texture. Others have relaxed the memory bandwidth limitations by reducing the size of the textures via compression. Procedural texturing hardware is a way of increasing the performance of current graphics hardware by augmenting its existing pre-stored 2D image textures with a variety of procedural solid textures without heavily impacting the hardware's memory requirements. Accessing a procedural texture requires more time or computing power than an image texture as the texture value must be computed instead of accessed from memory. Hence, real-time procedural texturing has previously only been available in high-end parallel graphics systems. These systems have also implemented solid texturing in hardware.

Antialiasing procedural textures is more complicated than for stored image textures. Whereas MIP maps and summed-area tables can be pre-computed and stored for image textures, procedural textures are generated on the fly and such antialiasing techniques can not be readily applied. Supersampling is a common technique for antialiasing procedural textures but directly increases rendering time. Band-limiting the procedural texture is also an effective antialiasing technique, but it only works easily and efficiently on procedures based completely on spectral synthesis. Accordingly, it would be an improvement in the art to develop a method and apparatus for antialiasing procedural textures which could be implemented in hardware. Additionally, it would be an improvement over the prior art to create a solid texture procedure which could provide procedural solid textures as a result of parameters passed to the procedure. Further, it would be an advancement in the art to develop an approximation of procedural texture modeling which could be implemented in a minimal amount of hardware.

OBJECTS AND SUMMARY OF THE INVENTION

It is an object of the present invention to provide a solid texturing procedure which receives parameters and produces selected procedural texture based on the values of the parameters received.

It is another object of the present invention to provide a method for antialiasing a solid texture procedure.

It is another object of the present invention to provide an approximation of solid texturing which can be implemented efficiently and cheaply in hardware.

It is yet another object of the present invention to provide a method for procedural solid texturing using a procedural solid texture generator which can generate multiple textures.

The presently preferred embodiment of the present invention is a method for applying procedural solid texturing to a computer generated image by mapping solid texture coordinates into a color space. The first step of producing a procedural solid texture is creating a quadric function generator to provide a quadric mapping function in three dimensional space. Then a noise function generator is combined with the quadric classification function generator to generate controlled stochastic values based on a specified input. The noise function can be generated using a Perlin noise function. Next, parameters are passed to the quadric function generator and the noise generator to determine a type of solid texturing that will be applied to a computer generated image. The parameters passed to the procedural solid texturing function determine the type of texture that is generated such as fire, water, clouds, etc.

In an alternative embodiment, of the invention the procedural texturing is antialiased after it is generated. The first step in antialiasing the procedural texture is determining the proper sampling frequency for the procedural solid texture to thereby determine the width of a filter. Then a filter is applied to the elements of the color table used by the procedural texturing to average the entries of the color table over the width of the filter where the filter width is based on the sampling frequency or the rate of change of the procedural texture at a given point.

In an alternative embodiment of the invention the procedural texture is antialiased by determining the proper sampling frequency for the procedural solid texture by finding the derivative of the procedural texture function. Then a value is calculated which has a magnitude for the width of the filter by taking half of the derivative. Finally, the color look up table entries between indices half a pixel in each direction on the derivative are averaged.

These and other objects, features, advantages and alternative aspects of the present invention will become apparent to those skilled in the art from a consideration of the following detailed description taken in combination with the accompanying drawings.

DISCLOSURE OF THE INVENTION

This invention provides a procedural texturing method capable of synthesizing the most commonly used procedural textures which is also concise enough to implement in hardware. The identification of this procedural texturing model allows the textures to be specified by parameters to a fixed procedure which can be simplified enough to be implemented in present-day VLSI technology.

The texturing invention also antialiases procedural textures based on computing a first order derivative approximation of the color index variance over the area of a pixel. This approximation allows the antialiasing method to simulate an area sample of the textured image faster than supersampling. Unlike bandlimiting which is a pre-filter, the new method is a post-filter that does not affect the parameters of the generation of the texture.

This invention uses a concise class of procedures capable of synthesizing a variety of textures and effects, but simple and direct enough to facilitate hardware implementation. The procedures are parameterized by values that completely control the type and character of the texture this model generates, such that these parameters and the texture's color map are the only representation of the texture that need be stored.

Procedural solid texture mapping uses a mapping of the form p: $R^3 \rightarrow R^4$ from solid texture coordinates s=(s,t,r) into a color space (R,G,B,$\alpha$). (Boldface type is used to indicate vector values and functions, and italics indicate scalar values and functions.) Often procedural solid textures incorporate a color map. In such cases, p=c o $f$ consists of an implicit classification of the texture space $f$: $R^3 \rightarrow R$ and a color map c: $R \rightarrow R^4$.

For a given polygon, the texture coordinate functions s(x)=(s(x),t(x),r(x)) indicate the range of the texture coordinates with respect to screen coordinates x=(x, y). Hence, the procedural texture can be evaluated with respect to screen coordinates as p(x)=c o f o s(x).

Figure 4:
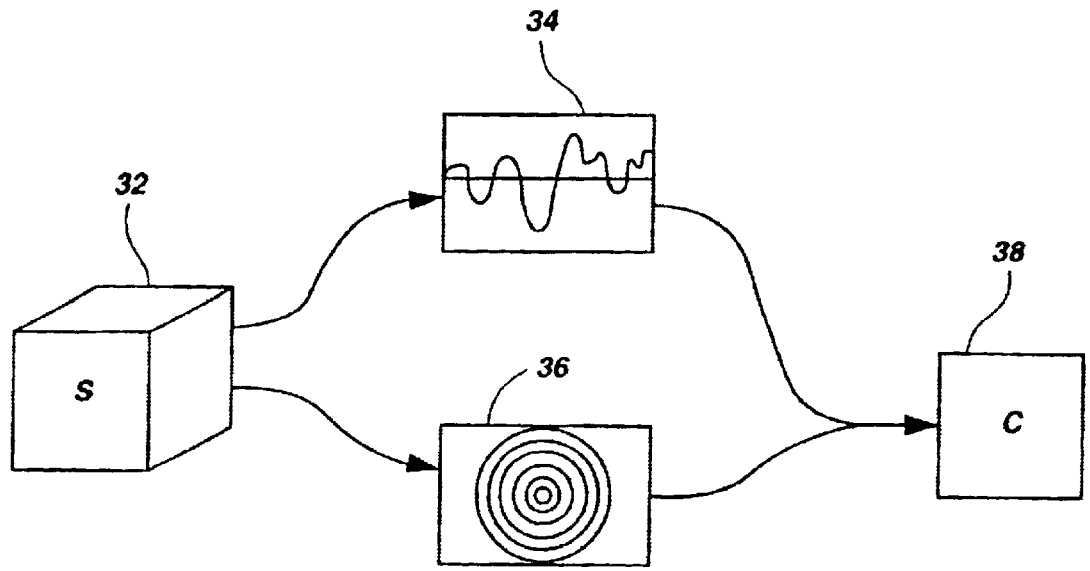
FIG. 4 shows a three-dimensional model space mapped to a color table through a noise and quadric function.

Texture mapping procedures p in this invention are restricted to the family of functions represented by $$p(s) = c\left(q(s) + \sum_i a_i n(T_i(s))\right) \quad \text{(Equation 1)}$$

where q: $R^3 \rightarrow R$ is a quadric classification function and n: $R^3 \rightarrow R$ is a noise function. The combination of quadrics and noise yields a specification sufficient to generate a wide variety of commonly used procedural solid textures. FIG. 4 shows the mapping used by Equation 1. The three dimensional space s 32 is the input for a quadric function 36 and a noise function 34. This function then generates an index into a color map 38.

The color map c associates a color (R,G,B) with each index returned by the classification function $f$. The color map c is typically implemented as a lookup table $$c(f) = \text{clut [round (n modclamp}(f))] \quad \text{(Equation 2)}$$

where clut[ ] is an array of n RGB color vectors. Color map indices returned by $f$ are, depending on a flag parameter, either clamped to [0,1] or taken modulo one to map within the bounds of the lookup table.

The quadric classification function will now be discussed in more detail. The function q: $R^3 \rightarrow R$ in Equation 1 is the quadric $$q(s,t,r) = As^2 + 2Bst + 2Csr + 2Ds + Et^2 + 2Ftr + 2Gt + Hr^2 + 2Ir + J \quad \text{(Equation 3)}$$

which can more conveniently be represented homogeneously as $$s^T Q s = [s, t, r, 1] \begin{bmatrix} A & B & C & D \\ B & E & F & G \\ C & F & H & I \\ D & G & I & J \end{bmatrix} \begin{bmatrix} s \\ t \\ r \\ 1 \end{bmatrix} \quad \text{(Equation 4)}$$

treating s as a homogeneous column vector.

The quadric function supports the spherical, cylindrical, hyperbolic and parabolic classification of space for texturing. Quadrics can be transformed from canonical form into a general affine image with the transformation $Q'=M^{*T}QM^*$.

The noise function n: $R^3 \rightarrow R$ in Equation 1 is an implementation of the Perlin noise function. The values $a_i$ control the amplitude of the noise function, whereas the affine transformation $T_i$ controls the frequency and phase of each noise component. In the preferred embodiment of the invention, there are a fixed number of noise components available and this limit is typically between four and eight in typical texturing examples.

Solid textures which can be generated by Equation 1 are the textures most commonly found in procedural solid texturing. The four fundamental procedural solid textures are: wood, clouds, marble and fire.

Figure 3:
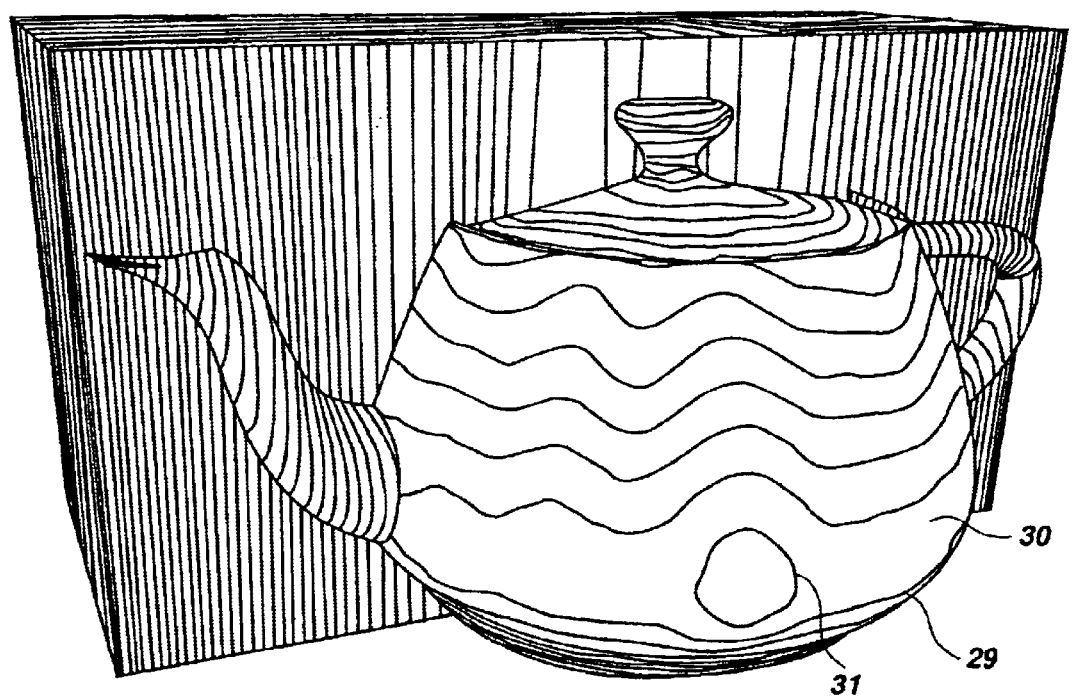
FIG. 3 shows a representation of a sphere procedurally textured with wood texture.

Wood texture is shown in FIG. 3, which represents the procedural texture model generated by using the quadratic function to classify the texture space into a collection of concentric cylinders. Waviness in the grain is created by modulation of a noise function:

$$f(s,t,r)=s^2+t^2+n(4s,4t,r). \quad \text{(Equation 5)}$$

The color map consists of a modulo-one linear interpolation of a light "earlywood" grain and a darker "latewood" grain. The quadric classification makes the early rings wider than the later rings, which is to a first approximation consistent with tree development.

Cloudy skies are made with a fractal $1/f$ sum of noise:

$$f(s) = \sum_{i=1}^{4} 2^{-i} n(2^i s). \quad \text{(Equation 6)}$$

The procedural texture described by Equation 6 is mapped onto a very large high-altitude polygon parallel to the ground plane resulting in clouds that become more dense in the distance due to perspective-corrected texturing coordinate interpolation. The color map is a clamped linear interpolation from blue to white. Water can be generated using the same procedural texture with a blue-to-black color map.

Marble procedural texturing uses the noise function in this invention to distort a linear ramp function of one coordinate.

$$f(s, t, r) = r + \sum_{i=1}^{4} 2^{-i} n(2^i s, 2^i t, 2^i r)). \quad \text{(Equation 7)}$$

The color map consists of a modulo-one table of colors from a cross section of the marble. Marble texture modeled on a cube using this invention allows the solid texturing to align the texture details on the edges of the cube. Continuously increasing the noise amplitude animates the formation of the ripples in the marble, simulating the pressure and heating process involved in the development of marble.

Like marble, fire is simulated by offsetting a texture coordinate with fractal noise and then mapping the texture onto a single polygon. The noise function used form modeling fire is:

$$f(s, t, r) = r + \sum_{i=1}^{4} 2^{-i} n(2^i s, 0, 2^i r + \phi)). \quad \text{(Equation 8)}$$

Continuously varying the noise phase term $\phi$ animates the fire texture.

Figure 1:
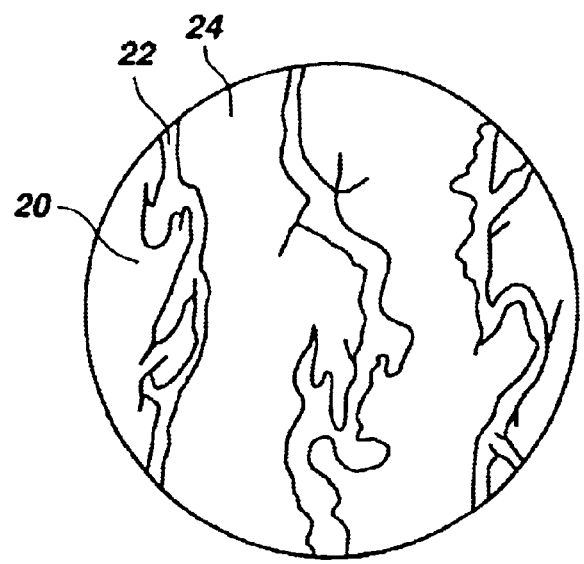
FIG. 1 shows a representation of a sphere procedurally textured with marble texture.
Figure 2:
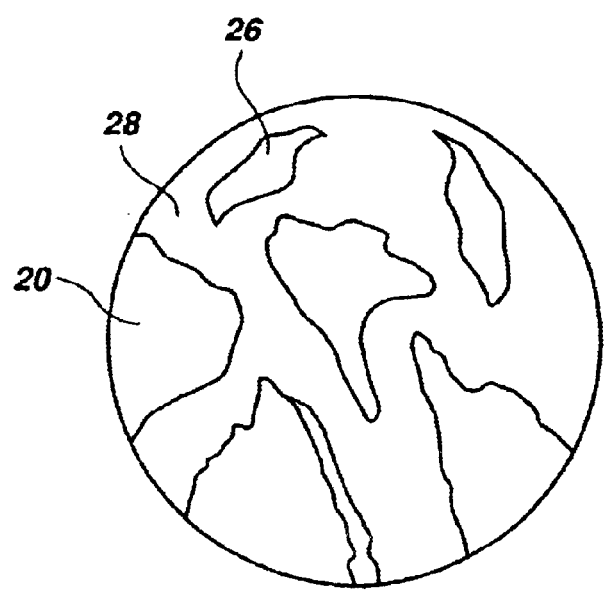
FIG. 2 shows a representation of a sphere procedurally textured with fractal mountains and ocean.

A wide variety of different planets may also be generated by this invention, such as the one shown in FIG. 2. Creating fractal textures using noise functions like Equation 6 and then applying the texture to a sphere provides a realistic planet texture. The color map for such images resembles a cartographic legend. Cloudy atmosphere can also be rendered on the same sphere "over" the planet in a second pass using a color map with varying opacity values. It should be realized based on this disclosure, that the previously unrecognized similarities between the noise equations used to produce the procedural solid texturing makes it possible to combine them into one procedure which receives parameters.

A moonrise or sunrise over water can also be rendered completely using procedural textures, without any other kind of shading. For example, the moon can be modeled as a sphere with fractal procedural texture. Then clouds may be rendered on a single polygon perpendicular to the viewer and imposed over the moon. Water can be rendered with a single polygon extending off to infinity. A highlight on the water can be modeled with two triangles procedurally textured with a partially transparent color map. This type of procedural texture scene can be generated by Equation 7, which is the same procedure used for the marble block.

Varying the parameters of a procedure yields a dynamic animated texture. Depending on the paths chosen through parameter space, these animations can smoothly loop or be non-repeating. These animated textures support such effects as ripples forming in marble, fire exploding, waves gently rising and falling, clouds billowing, and continents forming on planets.

The antialiasing of the procedural solid texturing of this invention will now be discussed. Image texture aliases occur due to texture magnification and minification. Texture magnification occurs when a single texture element projects to several screen pixels, whereas texture minification results when several texture elements project to the same screen pixel. Modem texture mapping hardware inhibits aliases due to texture magnification by bilinear or bicubic interpolation of the appropriate texture elements. Such hardware inhibits texture minification aliases through the use of a MIP map that precomputes lower resolution versions of the texture, and samples the NUP map using trilinear or tricubic interpolation of neighboring pixels at the appropriate resolution level.

Aliases of procedural textures do not fall into such categories since there is no fixed image resolution. Each procedural texture however does possess a certain sampling frequency and will exhibit aliases when sampled below this frequency. Hence, procedural textures do not suffer from magnification aliases, but do require filtering to avoid minification aliasing.

Precomputation of MIP maps for procedural textures is generally not desirable, and consumes a tremendous amount of space when used on solid textures. Bandlimiting the output of the procedure removes aliases by prefiltering the texture before sampling, but is difficult to implement in a generalized procedural texturing environment. Supersampling the texture only reduces aliases by pushing them into higher frequencies, but degrades time performance and arbitrarily increases the complexity of the hardware implementation.

Instead, the function p(x) that procedurally textures pixels is analyzed to determine an appropriate sampling frequency. This frequency corresponds to the width of a box filter that eliminates the aliasing frequencies from the procedural texture. The box filter is applied to the procedural texture by averaging the elements of the color table that the texture procedure generates over the width of the filter.

To determine the filter width, consider a domain D on the screen consisting of pixels whose color is determined solely by the projection of a single procedurally texture mapped polygon. Assume the color map indices are continuously interpolated across the polygon. Let $a=\min_D f(x)$ be the least possible color map index in the pixels in D, and let $b=\max_D f(x)$ be the greatest such index. Assume also that a and b fall within the bounds of the color table. Then assume $$\frac{\int_D p(x)dx}{\int_D dx} \approx \frac{\int_a^b c(f)df}{b-a} \quad \text{(Equation 9)}$$

the average color in D is sufficiently approximated by the average of the color table entries between indices a and b. A first-order approximation of the bounds a and b is used in the right hand side (RHS) of Equation 9 by differentiating the texture function $f(x)$ and setting $a=f(x)-\|\nabla f(x)\|/2$ and $b=f(x)+\|\nabla f(x)\|/2$. The remainder of this section describes this differentiation in detail, applies efficient methods for integrating the color map to determine the numerator of the RHS of Equation 9 and demonstrates the results.

Figure 5:
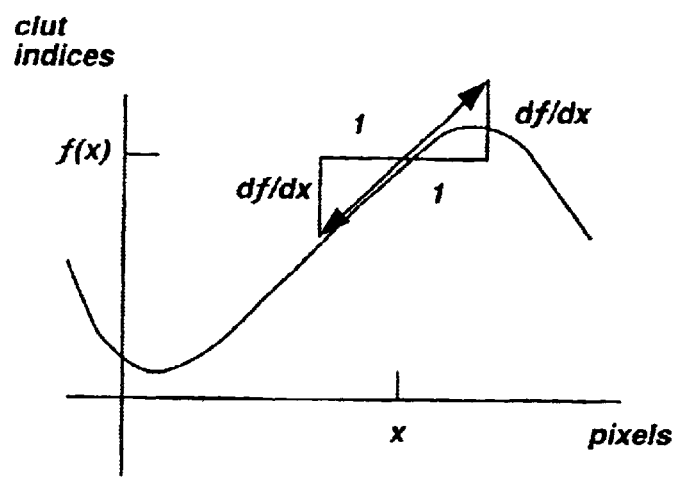
FIG. 5 shows the derivative df/dx which approximates the extent of the color map indices one pixel in either direction.

FIG. 5 shows the derivative df/dx which approximates the extent of the color map indices one pixel in either direction. Half of the derivative estimates the variation in color map indices half of a pixel in either direction. The horizontal axis corresponds to the location of pixels on the screen whereas the vertical axis corresponds to the color index of those pixels Differentiating the texture procedure calculates the magnitude of the gradient $\nabla f=(\partial f/\partial x, \partial f/\partial y)$ and indicates the width of the appropriate filter on the color map. Equation 1 when differentiated provides the gradient of function $f$ which is $$\nabla f = \nabla q + \sum_i a_i \nabla n_i \quad \text{(Equation 10)}$$

where $n_i$ is the ith noise function: $n(T_i(s))$. From Equation 3 the gradient of q is calculated as $$\nabla q(x) = s^T Q \frac{ds}{dx} + \left(\frac{ds}{dx}\right)^T Qs \quad \text{(Equation 11)}$$

$$= 2s^T Q \frac{ds}{dx}$$

$$= 2 [s\;t\;r\;0] \begin{bmatrix} A & B & C & D \\ B & E & F & G \\ C & F & H & I \\ D & G & I & J \end{bmatrix} \begin{bmatrix} \frac{\partial s}{\partial x} & \frac{\partial s}{\partial y} \\ \frac{\partial t}{\partial x} & \frac{\partial t}{\partial y} \\ \frac{\partial r}{\partial x} & \frac{\partial r}{\partial x} \\ 0 & 0 \end{bmatrix}$$

since Q is symmetric.
The derivative of the noise terms are given by $$a_i \nabla n(T_i s(x)) = a_i \frac{dn(T_i s(x))}{ds} T_i \frac{ds}{dx}. \quad \text{(Equation 12)}$$

The gradient $dn/ds = [\partial n/\partial s\; \partial n/\partial t\; dn/\partial r\; 0]$ is also known as the function Dnoise by those skilled in the art.

The value ds/dx is the Jacobian of the texture coordinates s with respect to the screen coordinates x. The value of ds/dx is computed during the scan conversion of the polygon as the perspective-corrected pixel increments. The values of ds/dy can be computed for each triangle using the plane equation and performing a perspective-correcting division.

The filtering of the color map values can be evaluated efficiently using either a color table MIP map or a summed area color table. MIP maps are commonly used in standard texturing systems to prefilter image textures and sample from the prefiltered texture when the texture is minified (insufficiently sampled by the image pixels).

This invention creates a MIP map of a color table. The process begins with the n-element full resolution color table $clut_1[\;]$. Then neighboring colors in the table are averaged to create a half-resolution n/2-element color table $clut_2[\;]$. This process is repeated until a one-element color table $clut_{lg\,n}[\;]$ results, representing the average color of the entire table.

Given a filter width w, let i=floor(lg w), where lg is the log base 2 of w. Then the proper resolution color table from the MIP map is selected based on the calculated value of i for $clut_i[\;]$ and the color indexed is returned as $clut_i[f/i]$ (or more accurately the linear or cubic interpolation of the values of $clut_i[f/i]$ and $clut_{i+1}[f/i+1]$).

Image textures are also antialiased efficiently using a summed area table which transforms information into a structure that can quickly perform integration, specifically a box filtering operation. The summed area color table consists of a table where each entry consists of the sum of all elements in the color table including the current entry's element $$csat[i] = \sum_{j=0}^{i} clut[j] \quad \text{(Equation 13)}$$

or recurrently as $csat[i]=csat[i-1]+clut[i]$. The current entry's element can be recovered by subtracting the previous summed area element from the current summed area element as $$clut[i]=csat[i]-csat[i-1] \quad \text{(Equation 14)}$$

for i>0. Box filtering the color map entries for a given filter width is computer as $$(csat[f+w/2]-csat[f-w/2])/w. \quad \text{(Equation 15)}$$

Special care must be taken for the cases where the support of the filter crosses the bounds of the color table. For the following cases N is the number of entries in the color table.
For the cases where:
1. $w \geq N$: The average of the entire color map is returned: $csat[N-1]/w$.
2. $f+w/2 \geq N$:
   a. mod: $(csat[f+w/2-N]+csat[N-1]-csat[f-w/2-1])/w$.
   b. clamp: $((f+w/2-(N-1))\,clut[N-1]+csat[f-w/2-1])/w$.
3. $f-w/2<0$:
   a. mod: $(csat[f+w/2]+csat[N-1]-csat[f-w/2-1])/w$.
   b. clamp: $(-(f-w/2)\,clut[0]+csat[f+w/2])/w$.

An alternative to performing the above computations at render time is to use the above formulae to precompute a color summed area table three times as long, ranging from $-N$ to $2N-1$.

The equations previously show that procedural textures produce aliasing artifacts for three possible reasons.
1. Quadric Variation: The quadric classification changes too quickly: $\|dq/ds\|$ too large.
2. Noise Variation: The noise changes too quickly: $a_i\|dn(T_i s)/ds\|$ too large.
3. Texture Coordinate: The texture coordinates change too quickly: $\|ds/dx\|$ too large.

Figure 6A:
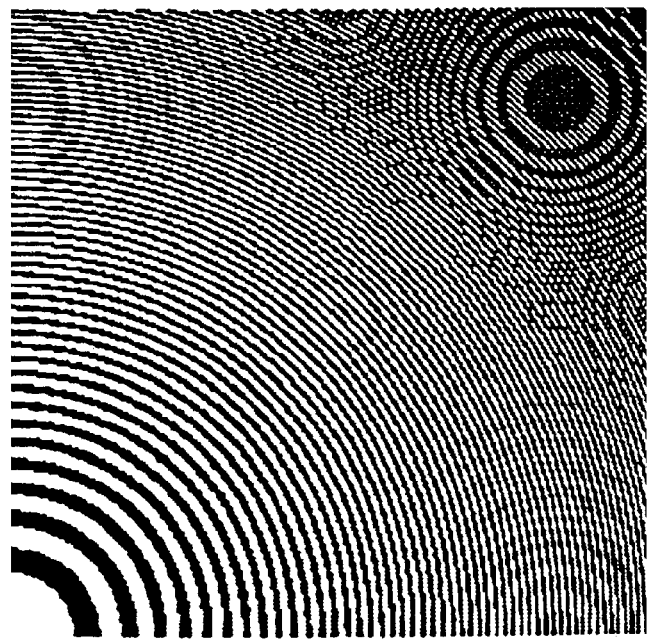
FIG. 6A shows a zone plate which is aliased.
Figure 6B:
FIG. 6B shows the zone plate of FIG. 6A after it has been color table filtered.

Each of these components can create a signal containing frequencies exceeding the Nyqist limit of the pixel sampling rate. FIG. 6A demonstrates quadratic variation aliasing (type #1) with a zone plate constructed from the procedure $$f(s,t,r)=50s^2+50t^2. \quad \text{(Equation 16)}$$

rendered with an extremely harsh "zebra" color map. Analysis of Equation 16 shows that the aliases are governed by $\nabla f = dq/ds \, ds/dx$, with $dq/ds=(100\,s, 100\,t)$. The zone plate was plotted at a resolution of $256^2$ and over the unit square in texture coordinate space, hence $\partial s/\partial x = \partial t/\partial y = 1/256$. Setting the color map filter width to $(100\,s+100\,t)/256$ reduces the aliases to the point of being barely noticeable. FIG. 6B shows the quadratic variation after filtering.

Noise variation aliases (type #2) happen in concert with texture coordinate aliasing (type #3), since in a single scene the frequency and amplitude of noise is constant, and only varies across the image with distance from the viewer. For example, texturing clouds on a horizon do not alias near the horizon because the filter width is scaled in part by the noise function derivative, and increases as the magnitude of ds/dx increases. In the distance as the projection of the noise reaches the Nyquist limit, the filter width reaches the size of the entire color table, yielding a homogeneous hazy blue color.

This invention is able to generate antialiased procedural solid textures that are implemented in a reduced amount of hardware. The procedural texturing hardware will now be outlined in block form, and a simplification of the computations will be shown which reduces the gate count from over one million gates to a goal of 100,000 gates or about 10% of the real-estate of current consumer level graphics.

Figure 7:
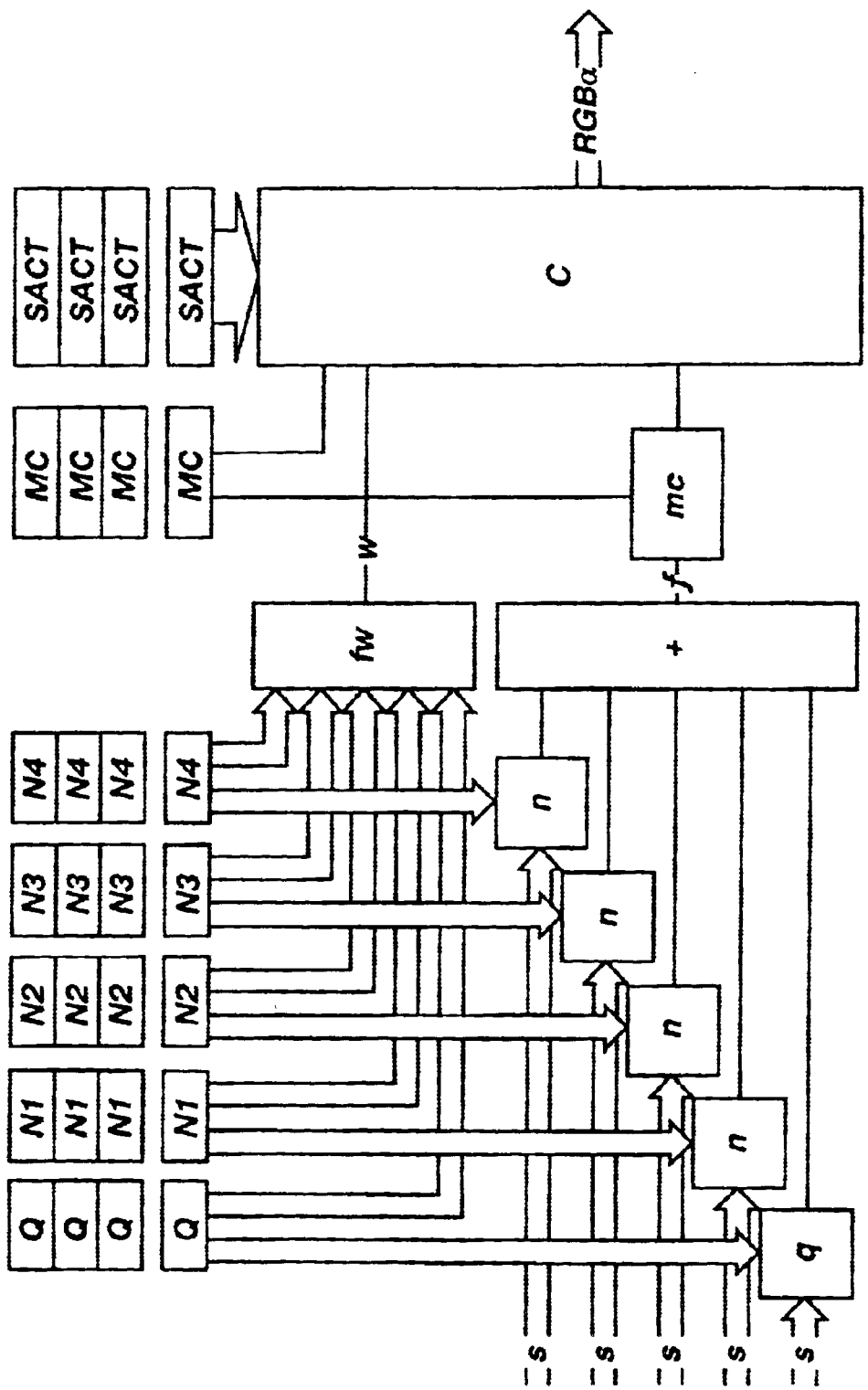
FIG. 7 shows a schematic system diagram of a hardware implementation of procedural solid texturing.

The implementation of the basic procedural solid texturing system is illustrated by the diagram in FIG. 7. This figure shows an array of texture parameters. Each solid textured polygon description includes an index to one set of parameters from this table. These parameters provide the constants for the quadric texture classification Q=(A, . . . , J) and the noise functions $N_i=(a_i, T_i)$, the modulation/clamping of the color map index (MC=1 (mod) or 0 (clamp)), and the color map C for the texture stored in its summed-area or MIP map representation. The indexes into the color map produce (R,G,B,α) values based on the filter width w determined by the calculations derived in the filter width processor shown as fw. SACT in FIG. 7 represents input from the summed area color table.

Table 1 shows that a fill hardware implementation of the procedural solid texturing system described in the previous two sections would require about 1.25 million gates, which is at the upper limit of present VLSI technology. However, careful reduction of parameters and features scales the hardware required down to a lower limit of 100,000 gates so it would be possible to implement in a 1 million gate polygon rasterization system.

TABLE 1

Gate count estimates for full and simplified VLSI implementations.

| | Full Implementation | Minimal Implementation |
|---|---|---|
| Coordinate Resolution | 32 bit (16 bit.16 bit) | 20 bit (12 bit.8 bit) |
| | Gate Count | |
| Quadric Generator | 150,000 gates | 20,000 gates |

TABLE 1-continued

Gate count estimates for full and simplified VLSI implementations.

| | Full Implementation | Minimal Implementation |
|---|---|---|
| Noise Generator | 450,000 (6 × 75,000) gates | 48,000 (3 × 16,000) gates |
| Filterwidth Computation | 300,000 gates | 8,000 gates |
| Color Table | 350,000 gates | 24,000 gates |
| Total Gates | 1,250,000 gates | 100,000 gates |

The discussion below describes the approximations necessary to implement the model in 100,000 gates. When approximating procedural texture generation, the minimum numerical precision needed for procedural texturing is 8 bits beyond the decimal point. This permits 256 steps between unit texture elements, which is about one quarter of typical screen resolution. Typical 512-pixel scenes of coarsely-triangulated objects computed at 8 bit precision were nearly indistinguishable from the full 16 bit precision. Using 12 bits for the integer part of the fixed point value allows as many as 4096 instances of noise functions to provide non-repeating detail approaching the horizon before numerical overflow would cause the detail to repeat.

The full specification for the quadric classification system requires maintenance of 10 parameters (A–J) and its computation requires 15 multiplications. However, simplified quadrics may be used of the form $$q'(s,t,r)=As^2+Et^2+Ir+J \quad \text{(Equation 17)}$$

which require only four parameters and five multiplications. With these reductions, a 16 bit precision quadric computation can be implemented with as few as 20,000 gates.

The noise specification requires maintenance of a 4×4 transformation matrix (12 parameters) plus an amplitude parameter, and its computation requires at least 13 multiplications. Smooth interpolation of the noise output requires as many as 24 additional multiplications. While the affine transformation provides maximum flexibility in the design of noise-based texture, typical applications use much reduced computations. The noise function is commonly summed into fractal $1/f^\beta$ frequency distribution and the lacunarity of such distributions is typically two. Hence it suffices to store three frequency exponents ($j_s$, $j_t$ and $j_r$), and three phase values ($\phi_s$, $\phi_t$ and $\phi_r$) in place of the affine transformation, reducing the noise model to $$an(2^{j_s}s+\phi, 2^{j_s}t+\phi, 2^{j_r}r+\phi) \quad \text{(Equation 18)}$$

Reducing the number of noise parameters to seven 16-bit quantities and using only one multiplication reduces its implementation to about 6,000 gates per noise component.

The linear interpolation of noise provides sufficiently convincing output compared to a more computationally intensive cubic interpolation of noise. Procedural textures that use sums of several noise functions serve to further disguise the smoothness of interpolation. The only drawback to this scheme is that the noise is not isotropic, and the grid structure is often perceptible in the final image. Others have rotated successive octaves of noise to remove this artifact, but such rotation is not available with the frequency/phase parameterization of Equation 18.

Since the interpolation of noise can be linear instead of cubic, existing 8-bit tri-linear interpolaters designed for MIP mapping can also be used for noise interpolation. Each noise generation computation therefore consists of about 10,000 gates including logic to generate 8-bit pseudo-random numbers indexed by three 16-bit coordinates hashed into a lookup table index. Reducing the number of noise components to three (from the ideal range of four to eight) results in a total noise function gate count of 48,000. Adding the quadric component gate count, the procedural texture color index resulting from the quadric classification and three noise components is generated using a total of about 68,000 gates.

The texture coordinate Jacobian are bounded with the three magnitudes $$\left\|\frac{ds}{dx}\right\| \le \left|\frac{ds}{dx}\right| + \left|\frac{ds}{dy}\right|,$$  (Equation 19)

$$\left\|\frac{dt}{dx}\right\| \le \left|\frac{dt}{dx}\right| + \left|\frac{dt}{dy}\right|, \left\|\frac{dr}{dx}\right\| \le \left|\frac{dr}{dx}\right| + \left|\frac{dr}{dy}\right|.$$

Since the filter width is limited to the size of the color map, its computation precision can be restricted to 8 bits. Using the triangle inequality, the gradient of Equation 17 is bound by $$\|\nabla q'\| \le 2As\left\|\frac{ds}{dx}\right\| + 2Et\left\|\frac{dt}{dx}\right\| + I\left\|\frac{dr}{dx}\right\|.$$  (Equation 20)

which, like the quadric component computation, requires only five multiplications, but at 8-bit precision reduces to about 4,000 gates.

Instead of implementing a hardware DNoise function, the magnitude of the components of dn/ds is bounded by setting, for our particular noise implementation of linear interpolation of random values from −1 to 1 at integer lattice points, max dn/ds=[2 2 2 0].

$$\|a_i \nabla n_i'\| \le |a_i|\left(2^{j_s+1}\left\|\frac{ds}{dx}\right\| + 2^{j_t+1}\left\|\frac{dt}{dx}\right\| + 2^{j_r+1}\left\|\frac{dr}{dx}\right\|\right)$$  (Equation 21)

Accordingly, the noise component computation, requires only a single multiplication, and at 8-bit resolution requires only about 1,000 gates per component.

Finally, the magnitude of the gradient of $f$ is bound by the approximation $$\|\nabla f\| \le \|\nabla q'\| + \sum_i \|a_i \nabla n_i'\|$$  (Equation 22)

implemented with a total of about 8,000 gates.

Given the sum returned by a summed area table, box filtering then requires a division by the filter width. To avoid the costs of division, a lookup table can be implemented containing the inverses of all positive integers no greater than the size of the color table. Another alternative is to round the filter width up to the next power of two, replacing the subsequent division with an arithmetic right shift.

The primary cost of the color table is the summed area color table. A 256-entry 32-bit RGBα color table requires a 256-entry 64-bit summed area table. Furthermore, two such tables must be stored, as the table must be accessed simultaneously two times (once for the upper bound and once for the lower bound). Such a table would then require 32 Kb of on-chip memory, which would exceed our current gate count goal.

Figure 8:
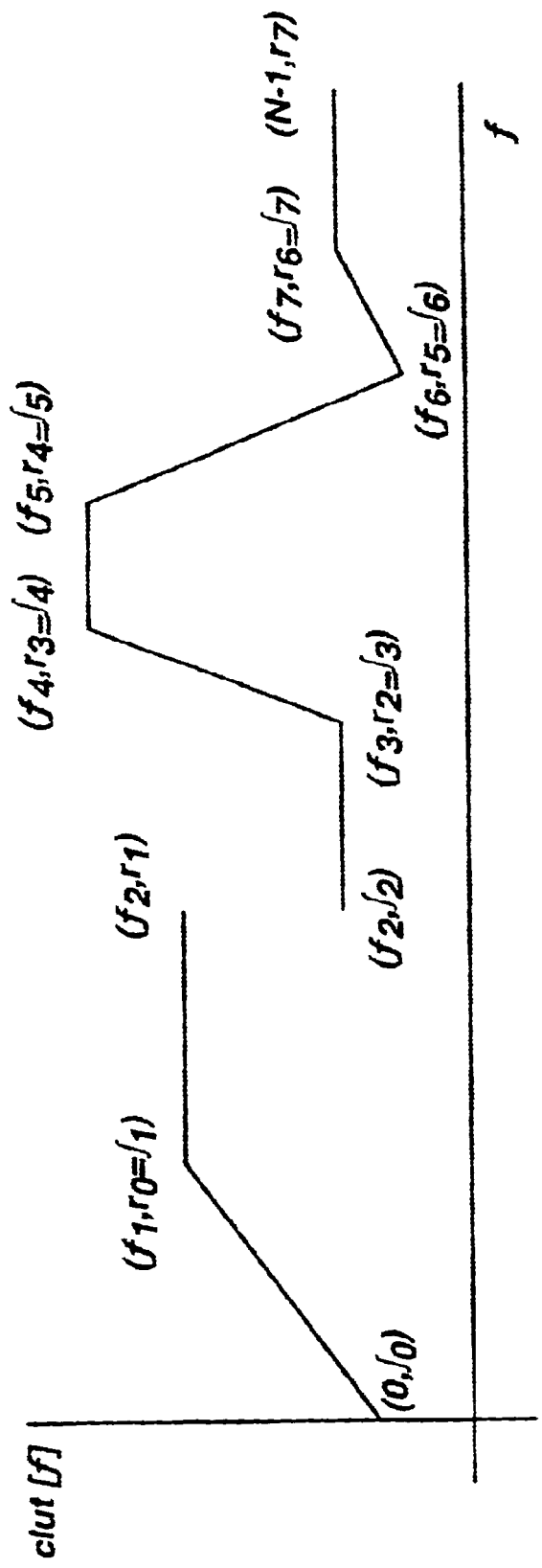
FIG. 8 shows one channel of a piecewise linear color table for use with procedural solid texturing.

An alternative embodiment for the color table is a sequence of linear interpolations. Desirable procedural textures can be generated using no more than 8 linear interpolations. Hence, the color table can be compressed into a set of 8 interpolations consisting of 8-bits per channel endpoint pairs. FIG. 8 shows one channel of a piecewise linear color table, representing each segment with a left and right clut channel value. It is important to note that the color table need not be continuous.

A summed area table is a discretization of an integral, and the summed area table of a piecewise linear color table is therefore a piecewise quadratic function and can be implemented with eight interpolation points and 8 inflection values. Since the precision of the endpoint values must be doubled from 8 bits to 16 bits, and an 8-bit inflection value is added, the storage of the piecewise quadratic summed area color table representation requires 1,144 bits. The only additional expense is a multiplier required to evaluate values from the quadratic functions in the summed area table. Using the piecewise quadratic summed area table, the entire color table implementation becomes tremendously efficient at about 24,000 gates.

Overall, the compromises in image quality necessary to implement the model in 100,000 gates are minor, and the effects are very subtle. In the reduced hardware embodiment of the current invention, some texture coordinate aliasing is noticeable on the polygons closest to the viewer. The reduced number of noise octaves changes the character of the water, clouds, planet and moonrise textures making them slightly smoother. In addition, the degradation of the noise due to linear interpolation can be detected in water, clouds, etc., but is much more noticeable in the procedural texture representing fire.

It should be realized that while the preferred embodiment of this invention is implemented as hardware in a reduced gate format, the invention could also be implemented using the full scale gate format. In an alternative embodiment, this invention could also be incorporated as a plug-in to existing software rendering systems.

The above-described arrangements are only illustrative of the application of the present invention. Numerous modifications and alternative arrangements may be devised by those skilled in the art without departing from the spirit and scope of the present invention. The appended claims are intended to cover such modifications and arrangements.

What claimed is:

1. A method for generating procedural texture for use in a computer generated image by mapping geometric coordinates into a color space, comprising the steps of:

(a) creating a quadric function generator to provide a quadric mapping function in three dimensional space;

(b) creating at least one noise function generator to modulate the output of the quadric function with stochastic values based on geometric coordinates;

(c) passing parameters to the quadric function generator and at least one noise function generator to determine a type of texturing that will be applied to the computer generated image;

(d) using a single procedure which can generate a plurality of procedural textures which are represented by the following equation:

$$p(s) = c\left(q(s) + \sum_i a_i n(T_i(s))\right)$$

wherein q(s) represents a quadric function generator, n is a noise function generator, $a_i$ is the amplitude of the noise function, $T_i$ is the frequency and phase of each noise function, and c represents the color map which associates a red, blue, green, alpha (RGBα) color with each index produced by the quadric function generator and the noise function generator; and (e) determining color lookup table indexes to provide colors for the procedural texture wherein indexes are generated by the quadric function generator combined with the noise function generator.

2. The method as in claim 1 wherein the step of creating at least one noise function generator further comprises the step of using a noise function generator that uses the Perlin noise function.

3. A method for generating procedural texture for use in a computer generated image by mapping geometric coordinates into a color space, comprising the steps of:

(a) creating a quadric function generator to provide a quadric mapping function in three dimensional space;

(b) creating at least one noise function generator to modulate the output of the quadric function with stochastic values based on geometric coordinates;

(c) passing parameters to the quadric function generator and at least one noise function generator to determine a type of texturing that will be applied to the computer generated image;

(d) differentiating the procedural texture by differentiating the quadric function and noise functions with respect to screen coordinates for computing an appropriate filter width for the texture generated; and (e) determining color lookup table indexes to provide colors for the procedural texture wherein indexes are generated by the quadric function generator combined with the noise function generator.

4. The method of claim 1 wherein the step of passing parameters to the quadric function generator and the noise function generator to determine a type of texturing that will be applied to a computer generated image further comprises the step of determining the type of texturing that will be applied based on the parameters passed to the quadric function generator and noise function generator wherein the type of texturing is selected from the group consisting of wood, clouds, water, marble, fire, and terrain.

5. The method as in claim 1 wherein the step of passing parameters to the noise function generator further comprises the step of using a fractal sum of noise to produce cloud texture when selected parameters are received.

6. The method as in claim 1 wherein the step of passing parameters to the quadric function generator further comprises the step of using a collection of concentric cylinders and a modulation of a noise function generator to produce a wood texture when selected parameters are received.

7. The method as in claim 1 wherein the step of passing parameters to the quadric function further generator comprises the step of using a texture coordinate offset with fractal noise to produce marble and fire when selected parameters are received.

8. The method as in claim 1 wherein the step of creating a quadric function generator further comprises the step of creating a quadric function generator which uses a quadric function of the form, $q(s,t,r)=As^2+2Bst+2Csr+2Ds+Et^2+2Ftr+2Gt+Hr^2+2Ir+J$.

9. The method as in claim 1 wherein the step of creating a quadric function generator further comprises the step of creating a quadric function generator which uses a quadric function of the form, $q'(s,t,r)=As^2+Et^2+Ir+J$ wherein the quadric function generator can be implemented in fewer hardware gates than a function using more than four terms.

10. The method as in claim 1 wherein the step of using a noise function generator further comprises the step of using a noise function generator which linearly interpolates the noise produced.

11. The method as in claim 1 wherein the step of using a noise function generator further comprises the step of using a noise function generator which uses cubic interpolated noise.

12. The method as in claim 1 further comprising the step of differentiating the procedural texture by differentiating a quadric function and noise functions with respect to screen coordinates for computing an appropriate filter width for antialiasing the texture generated.

* * * * *